(12) United States Patent
Barbas et al.

(10) Patent No.: US 10,127,277 B2
(45) Date of Patent: Nov. 13, 2018

(54) OUTER JOIN OPTIMIZATIONS IN DATABASE MANAGEMENT SYSTEMS

(71) Applicant: International Business Machines Corporation, Armonk, NY (US)

(72) Inventors: Pedro M. Barbas, Dunboyne (IE); Peter J. Duffy, Dublin (IE); Lei Pan, Dublin (IE); David M. Tilson, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 14/814,544

(22) Filed: Jul. 31, 2015

(65) Prior Publication Data
US 2017/0031989 A1 Feb. 2, 2017

(51) Int. Cl.
*G06F 17/30* (2006.01)
(52) U.S. Cl.
CPC .............. *G06F 17/30454* (2013.01)
(58) Field of Classification Search
CPC .............................. G06F 17/30454
USPC ........................................ 707/714
See application file for complete search history.

(56) References Cited

U.S. PATENT DOCUMENTS

| | | | | | |
|---|---|---|---|---|---|
| 5,963,933 | A | * | 10/1999 | Cheng | G06F 17/30454 |
| 7,546,311 | B2 | * | 6/2009 | Nica | G06F 17/30454 |
| 8,352,461 | B2 | * | 1/2013 | Ahmed | G06F 17/30492 707/714 |
| 8,396,860 | B1 | * | 3/2013 | Ramesh | G06F 17/30454 707/713 |
| 8,600,994 | B1 | * | 12/2013 | Xu | G06F 17/30498 707/737 |
| 8,868,545 | B2 | * | 10/2014 | Xu | G06F 17/30489 707/713 |
| 2009/0119247 | A1 | * | 5/2009 | Bellamkonda | G06F 17/30498 |
| 2009/0292669 | A1 | * | 11/2009 | Ahmed | G06F 17/30466 |

(Continued)

OTHER PUBLICATIONS

Pedro et al., "Outer Join Optimizations in Database Management Systems", U.S. Appl. No. 15/177,392, filed Jun. 9, 2016, 63 pages.
(Continued)

*Primary Examiner* — Mark E Hershley
(74) *Attorney, Agent, or Firm* — Noah A. Sharkan; Aaron N. Pontikos

(57) ABSTRACT

In one embodiment, a method of processing a structured query language (SQL) statement is provided, comprising: determining whether a first query and a second query are equivalent, the first and second queries being respectively the left side and the right side operands of the OUTER JOIN operation; determining whether a SELECT output of the SQL statement does not refer to database columns from the left side of the OUTER JOIN operation which are not also partitioning columns of the OUTER JOIN operation; and responsive to determining that the first query and the second query are equivalent and that the SELECT output of the SQL statement does not refer to database columns from the left side of the OUTER JOIN operation which are not also partitioning columns of the OUTER JOIN operation, transforming the SQL statement into an optimized query SQL statement by removing the OUTER JOIN operation.

9 Claims, 13 Drawing Sheets

(56) References Cited

U.S. PATENT DOCUMENTS

2013/0173589 A1* 7/2013 Xu .................... G06F 17/30466
       707/714
2014/0101130 A1  4/2014 Kang et al.
2016/0275078 A1* 9/2016 Attaluri ............. G06F 17/30498

OTHER PUBLICATIONS

IBM, Appendix P, List of IBM Patents or Patent Applications Treated as Related, dated Jun. 9, 2016, 2 pages.

Boag et al., "XQuery 1.0: An XML Query Language (Second Edition)", W3C®, W3C Recommendation Dec. 14, 2010 (Link errors corrected Jan. 3, 2011), pp. 1-106, Copyright © 2010 W3C®.

Codd, E. F., "Extending the Database Relational Model to Capture More Meaning", IBM Research Laboratory, ACM Transactions on Database Systems, vol. 4, No. 4, Dec. 1979, pp. 397-434, doi 10.1145/320107.329109, © 1979 ACM 0362-5915/79/1200-0397.

Dayal et al., "View Definition and Generalization for Database Integration in a Multidatabase System", IEEE Transactions on Software Engineering, vol. SE-10, No. 6, Nov. 1984, pp. 628-645, © 1984 IEEE.

Galindo-Legaria, Cesar A., "Algebraic Optimization of Outerjoin Queries," a thesis presented to the Division of Applied Sciences in partial fulfillment of the requirements for the degree of Doctor of Philosophy in the subject of Computer Science, Harvard University, Cambridge, Massachusetts, Jun. 1992, pp. 1-122.

Galindo-Legaria et al., "How to Extend a Conventional Optimizer to Handle One- and Two-Sided Outerjoin", pp. 402-409, © 1992 IEEE.

Galindo-Legaria et al., "Outerjoin Simplification and Reordering for Query Optimization", ACM Transactions on Database Systems, vol. 22, No. 1, Mar. 1997, pp. 43-74, © 1997 ACM.

Ghazal et al., "Outer Join Elimination in the Teradata RDBMS", NCR Corporation, Teradata Division, 100 N. Sepulveda Blvd., El Segundo, CA, 90245, DEXA 2004, LNCS 3180, pp. 730-740, 2004, © Springer-Verlag Berlin Heidelberg 2004.

Hernandez et al., "Clio: A Semi-Automatic Tool for Schema Mapping", ACM SIGMOD 2001, May 21-24, Santa Barbara, California, USA, Copyright 2001 ACM 1-5813-332-4/01/05, 1 page.

"Elimination of unnecessary inner and outer joins", SQL Anywhere 12.0.0, printed on Jun. 8, 2015, 1 page, Copyright © 2010, iAnywhere Solutions, Inc.—SQL Anywhere 12.0.0.

"Method and System for Full Outer Join Elimination in the Presence of Multiple Distinct Aggregation", An IP.com Prior Art Database Technical Disclosure, Authors et. al.: Disclosed Anonymously, IP.com No. 000212340, IP.com Electronic Publication: Nov. 7, 2011, pp. 1-6, <IP.com at: http://null/IPCOM/000212340>.

* cited by examiner

EMPLOYEE TABLE

| emp_id | emp_name | dept_id | dept_name | salary |
|---|---|---|---|---|
| 1 | Paddy | 1 | MA | 1000 |
| 2 | Brian | 1 | MA | 2000 |
| 3 | Mark | 2 | RMA | 3000 |
| 4 | Mary | 3 | CMA | 1000 |
| 5 | David | 3 | CMA | 3000 |
| 6 | Joey | 4 | TA | 4000 |
| 7 | Sondra | 4 | TA | 5000 |

FIG. 2A

EMPLOYEE_ORDER TABLE

| emp_ord_id | emp_id | emp_name | order |
|---|---|---|---|
| 1 | 1 | Paddy | 100 |
| 2 | 2 | Brian | 1000 |
| 3 | 3 | Mark | 500 |
| 4 | 4 | Mary | 800 |
| 5 | 5 | David | 800 |
| 6 | 6 | Joey | 600 |
| 7 | 7 | Sondra | 500 |

FIG. 2B

SELECT emp_salary.emp_id, emp_order.order
   FROM                                      ← 306

302 ↘

→ (SELECT * FROM employee_order) AS emp_order
                       FULL OUTER JOIN            ← 308
310 ↗

304 ↘

→ (SELECT emp_id,salary FROM employee) AS emp_salary
          ON emp_salary.emp_id = emp_order.emp_id;

OUTER JOIN OPTIMIZATIONS IN DATABASE MANAGEMENT SYSTEMS

BACKGROUND

The present invention relates to computer database management systems, and more particularly to the optimization and transformation of database queries that include OUTER JOIN operations.

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

SQL supports OUTER JOIN and INNER JOIN operations. The semantics of the OUTER JOIN operation are outlined as follows. An OUTER JOIN involves a join of two tables, which are referred to as the left table and the right table. An OUTER JOIN is a modification of an INNER JOIN in that it preserves all information from one or both of the input relations.

An outer join can be further categorized into left, right (single-sided), or full (two-sided) OUTER JOIN, depending on which side needs to be preserved. These operations have two operands, the left and right tables. If tuples of both tables are preserved, then the operation is called FULL OUTER JOIN. If the tuples of only one table are preserved, e.g., the left table or the right table, then the result is respectively a LEFT OUTER JOIN or a RIGHT OUTER JOIN. In the output or answer set, for the non-matching tuples of a preserved table, NULL values are assigned to the columns of the other table.

A SQL query that is submitted to the RDBMS is analyzed by a query optimizer. Based on the analysis, the query optimizer generates an execution plan optimized for efficient execution. The optimized execution plan may be based on a rewrite of the query. One technique for SQL query optimization involves simplifying queries based on the nature of null-intolerant predicates.

SUMMARY

According to one embodiment of the present invention, a method is provided for processing a structured query language (SQL) statement, the SQL statement comprising at least an OUTER JOIN operation, the method comprising: determining, by one or more computer processors, whether a first query and a second query are equivalent, the first and second queries being respectively the left side and the right side operands of the OUTER JOIN operation; determining, by one or more computer processors, whether a SELECT output of the SQL statement does not refer to database columns from the left side of the OUTER JOIN operation which are not also partitioning columns of the OUTER JOIN operation; and responsive to determining that the first query and the second query are equivalent and that the SELECT output of the SQL statement does not refer to database columns from the left side of the OUTER JOIN operation which are not also partitioning columns of the OUTER JOIN operation, transforming, by one or more computer processors, the SQL statement into an optimized query SQL statement by removing the OUTER JOIN operation.

According to another embodiment of the present invention, a computer program product is provided for processing a structured query language (SQL) statement, the SQL statement comprising at least an OUTER JOIN operation, the computer program product comprising: one or more computer readable storage media and program instructions stored on the one or more computer readable storage media, the program instructions comprising program instructions to: determine whether a first query and a second query are equivalent, the first and second queries being respectively the left side and the right side operands of the OUTER JOIN operation; determine whether a SELECT output of the SQL statement does not refer to database columns from the left side of the OUTER JOIN operation which are not also partitioning columns of the OUTER JOIN operation; and responsive to determining that the first query and the second query are equivalent and that the SELECT output of the SQL statement does not refer to database columns from the left side of the OUTER JOIN operation which are not also partitioning columns of the OUTER JOIN operation, transform the SQL statement into an optimized query SQL statement by removing the OUTER JOIN operation.

According to another embodiment of the present invention, a computer system is provided for processing a structured query language (SQL) statement, the SQL statement comprising at least an OUTER JOIN operation, the computer system comprising: one or more computer processors; one or more computer readable storage media; and program instructions stored on the one or more computer readable storage media for execution by at least one of the one or more processors, the program instructions comprising program instructions to: determine whether a first query and a second query are equivalent, the first and second queries being respectively the left side and the right side operands of the OUTER JOIN operation; determine whether a SELECT output of the SQL statement does not refer to database columns from the left side of the OUTER JOIN operation which are not also partitioning columns of the OUTER JOIN operation; and responsive to determining that the first query and the second query are equivalent and that the SELECT output of the SQL statement does not refer to database columns from the left side of the OUTER JOIN operation which are not also partitioning columns of the OUTER JOIN operation, transform the SQL statement into an optimized query SQL statement by removing the OUTER JOIN operation.

BRIEF DESCRIPTION OF THE DRAWINGS

Preferred embodiments of the present invention will now be described in more detail, by way of example only, with reference to the accompanying drawings, in which:

FIGS. 2A and 2B show two example tables which may be used with embodiments of the invention;

FIG. 3 shows an exemplary query Q1 which may be used with a first embodiment of the invention;

DETAILED DESCRIPTION

Figure 1:
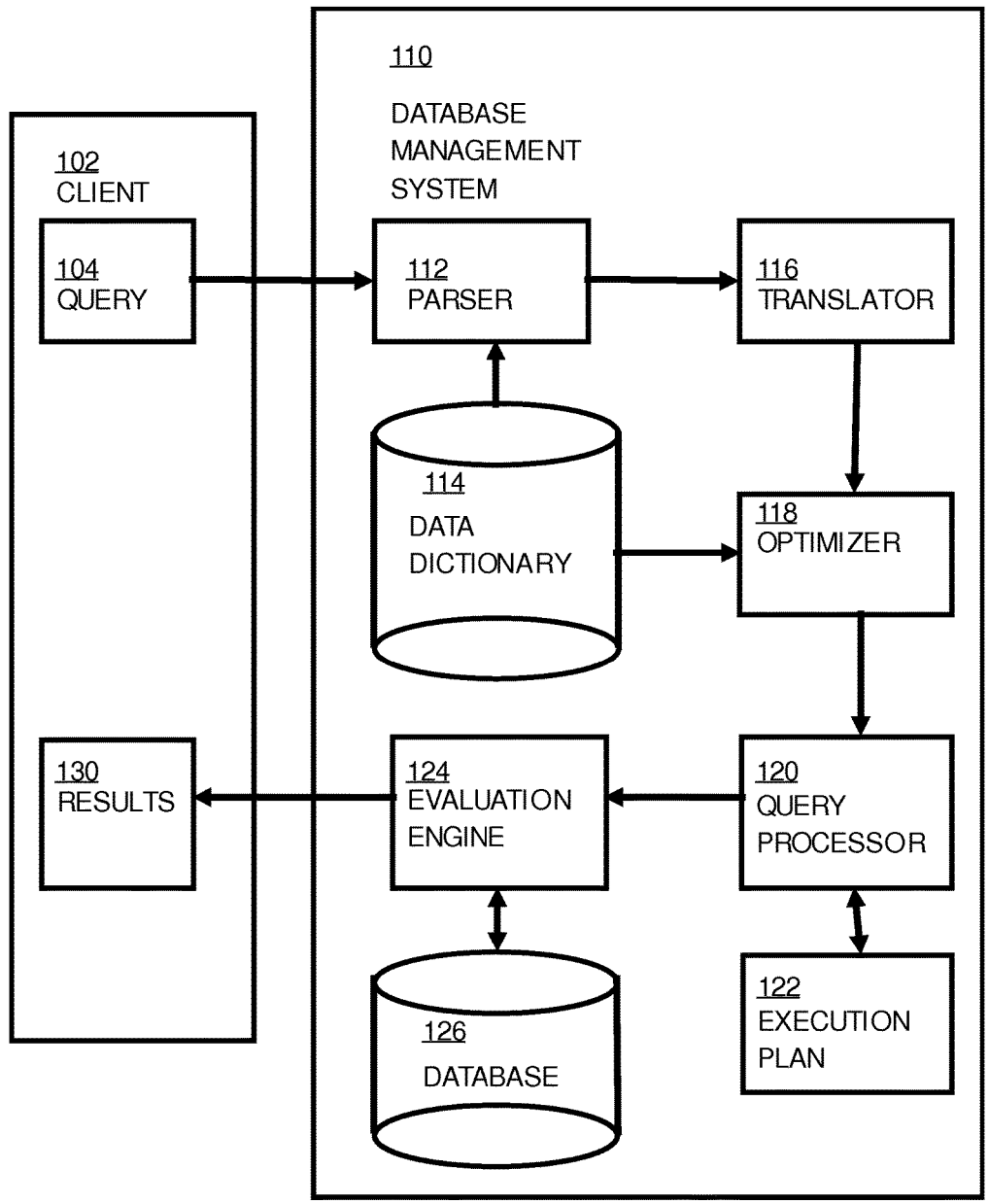
FIG. 1 shows a database management system in which embodiments of the invention may be implemented.

FIG. 1 shows a database management system 110 in which embodiments of the present invention may be implemented. Client 102 submits an SQL query 104 to parser 112 in database management system 110. Parser 112 checks the syntax of the SQL query 104, the table names and the like. The table names and the like are stored in the data dictionary 114. Translator 116 converts the parsed SQL query 104 from high level language SQL to low level instructions. Optimizer 118 uses statistical data stored in the data dictionary 114 to optimize the low level instructions. The statistical data may comprise information about the size of the table, the length of records, indices created on the table and the like. Query processor 120 uses the information collected by the optimizer 118 to find different sets of low level instructions that are equivalent to the SQL query 104. SQL query may typically be expressed in low level instructions in a plurality of ways. Each of the ways of expressing the low level instructions corresponding to the SQL query 104 is put into a corresponding execution plan 122. The only limitation on the low level instructions in the execution plan 122 are that they need to provide the same answer as the SQL query. Each of the execution plans 122 returns the same result but based on the statistical data each will differ in terms of the time taken to execute the query or the storage required to execute the query. Evaluation engine 124 calculates the cost in time and storage to execute each of the execution plans 122 and typically chooses the one that is most efficient in terms of time and storage. Evaluation engine 124 then executes the set of low level instructions in the chosen execution plan 122 by accessing the database 126. Evaluation engine 124 then returns the resulting records from the database 126 to the client 102 as the results 130.

In certain embodiments of the invention, query processor 120 receives an SQL query 104 that comprises at least an OUTER JOIN operation. Query processor 120 determines whether a first query and a second query are "equivalent", the first and second queries being respectively the left side and the right side operands of the OUTER JOIN operation. The meaning of "equivalent" is defined below. Query processor 120 can also determine whether the SELECT output of the SQL statement does not refer to database columns from the left side of the OUTER JOIN operation which are not also partitioning columns of the OUTER JOIN operation. Furthermore, query processor 120 can, responsive to determining that the first query and a second query are "equivalent" and that the SELECT output of the SQL statement does not refer to database columns from the left side of the OUTER JOIN operation which are not also partitioning columns of the OUTER JOIN operation, transform the SQL statement into an optimized query SQL statement by removing the OUTER JOIN operation.

Before describing embodiments of the invention in detail, a few definitions will be provided.

Two queries, or subqueries, are "equivalent" if they produce the same multi-set results. A "multi-set" is a collection of unordered objects that may include duplicate objects. The result of an SQL query, for example, is generally a multi-set unless it has been specified that the query returns distinct and/or ordered results. The two queries are equivalent (but not "exactly" equivalent) when one query contains or is contained by the other query, that is, one query subsumes or is subsumed by the other query, which means that each row from the first query is equivalent to one row from the second query, but the second query can, for example, have duplicates rows. The two queries are "exactly" equivalent when each row from the first query is equivalent to one row and only one row from the second query.

A query or subquery X "contains" another query or subquery Y, if the result of Y is a subset of the result of X. In this case, X is called the "container" query or subquery, and Y is called the "contained" query or subquery.

A multiple distinct aggregate type query is any query with multiple aggregation functions in the select list where the DISTINCT clause is specified on two or more different columns. For example:

```
SELECT Col1, COUNT(DISTINCT Col1), SUM(DISTINCT Col2)
FROM Table1
GROUP BY Col1
```

Embodiments of the present invention provide enhancements to database query optimization. Detection of the fact that the inner data is sufficient to fulfill the query may be used to optimize queries by the elimination of unnecessary OUTER JOINs. Where the inner table contains the set of columns specified in the OUTER JOIN selection, the OUTER JOIN can be eliminated, thus dramatically improving the performance of the query.

In a simplistic example, take two tables A & B, with table A containing columns V, W and X and table B containing columns X, Y and Z. Consider a query "SELECT V, W, X FROM A FULL OUTER JOIN B ON A.X=B.X". The OUTER JOIN can be optimized out since the values or V, W and X can be taken from the inner table A. While very carefully written SQL can avoid the need to use this optimization, it is often the case that SQL statements are complex and such possible optimizations are not obvious to the human eye. Additionally, SQL generators often will not create the most efficient SQL statements and optimization within the query engine is desirable.

FIGS. 2A and 2B show two example tables which may be used with embodiments of the invention. The example tables are included only for the purposes of explanation of the operation of embodiments of the invention. Embodiments of the invention may be used with any tables and no restrictions are intended or are to be implied by the inclusion of the example tables. The two example tables, employee, and employee_order were created using the following statements:

```
create table employee
(
    emp_id integer,
    emp_name char(100),
    dept_id integer,
    dept_name char(100),
    salary integer
);
create table employee_order
(
    emp_ord_id integer,
    emp_id integer,
    emp_name char(100),
    order integer
);
```

```
INSERT INTO employee VALUES (1,'Paddy',1,'MA',1000);
INSERT INTO employee VALUES (2,'Brian',1,'MA',2000);
INSERT INTO employee VALUES (3,'Mark',2,'RMA',3000);
INSERT INTO employee VALUES (4,'Mary',3,'CMA',1000);
INSERT INTO employee VALUES (5,'David',3,'CMA',3000);
INSERT INTO employee VALUES (6,'Joey',4,'TA',4000);
INSERT INTO employee VALUES (7,'Sondra',4,'TA',5000);
INSERT INTO employee_order VALUES (1,1,'Paddy',100);
INSERT INTO employee_order VALUES (2,2,'Brian',1000);
INSERT INTO employee_order VALUES (3,3,'Mark',500);
INSERT INTO employee_order VALUES (4,4,'Mary',800);
INSERT INTO employee_order VALUES (5,5,'David',800);
INSERT INTO employee_order VALUES (6,6,'Joey',600);
INSERT INTO employee_order VALUES (7,7,'Sondra',500);
```

FIG. 3 shows an exemplary query Q1 which may be used with a first embodiment of the invention. In the example of FIG. 3, a first query 302 forms the left side operand of an OUTER JOIN 310 command and a second query 304 forms the right side operand of an OUTER JOIN command. The first query 302 includes a left quantifier 306 and the second query 304 includes a right quantifier 308. The OUTER JOIN command 310 includes a predicate 312.

In the following description of embodiments of the invention, for the purposes of explanation, numerous specific details are set forth in order to provide a thorough understanding of the present invention. It will be apparent, however, that embodiments of the present invention may be practiced without these specific details.

In a first embodiment of the invention, an equality operation, a database user, in order to extract specific employee order details from the tables employee and employee_order of FIGS. 2A and 2B, uses the following SQL query Q1:

```
Q1:
SELECT emp_salary.emp_id, emp_order.order
    FROM
        (SELECT * FROM employee_order) AS emp_order
        FULL OUTER JOIN
        (SELECT emp_id,salary FROM employee) AS emp_salary
            ON emp_salary.emp_id = emp_order.emp_id;
```

Starting with the (SELECT * FROM employee_order) AS emp_order portion, this selects all columns from the employee_order table and creates a table alias of emp_order for the selection.

The (SELECT emp_id, salary FROM employee) AS emp_salary portion selects only the emp_id and salary columns from the employee table and creates a table alias of emp_salary for the selection.

TABLE 1

| emp_salary | |
| --- | --- |
| emp_id | salary |
| 1 | 1000 |
| 2 | 2000 |
| 3 | 3000 |
| 4 | 1000 |
| 5 | 3000 |
| 6 | 4000 |
| 7 | 5000 |

The FULL OUTER JOIN portion joins records in both tables, putting a NULL Value in every column of the table that lacks a matching row. In this example, there are no columns in the table which lack a matching row.

TABLE 2

| FULL OUTER JOIN result | | | | | |
| --- | --- | --- | --- | --- | --- |
| emp_order.emp_ord_id | emp_order.emp_id | emp_order.emp_name | emp_order.order | emp_salary.emp_id | emp_salary.salary |
| 1 | 1 | Paddy | 100 | 1 | 1000 |
| 2 | 2 | Brian | 1000 | 2 | 2000 |
| 3 | 3 | Mark | 500 | 3 | 3000 |
| 4 | 4 | Mary | 800 | 4 | 1000 |
| 5 | 5 | David | 800 | 5 | 3000 |
| 6 | 6 | Joey | 600 | 6 | 4000 |
| 7 | 7 | Sondra | 500 | 7 | 5000 |

The ON emp_salary.emp_id=emp_order.emp_id predicate 312 portion applies a condition to the rows which are selected, meaning that the rows for which emp_id in each of the two tables are not equal are not selected. In this example there are no rows for which emp_id in each of the two tables are not equal and so all rows are selected

TABLE 3

| FULL OUTER JOIN with predicate result | | | | | |
| --- | --- | --- | --- | --- | --- |
| emp_order.emp_ord_id | emp_order.emp_id | emp_order.emp_name | emp_order.order | emp_salary.emp_id | emp_salary.salary |
| 1 | 1 | Paddy | 100 | 1 | 1000 |
| 2 | 2 | Brian | 1000 | 2 | 2000 |
| 3 | 3 | Mark | 500 | 3 | 3000 |
| 4 | 4 | Mary | 800 | 4 | 1000 |
| 5 | 5 | David | 800 | 5 | 3000 |
| 6 | 6 | Joey | 600 | 6 | 4000 |
| 7 | 7 | Sondra | 500 | 7 | 5000 |

The SELECT emp_salary.emp_id, emp_order.order FROM portion selects only the emp_salary.emp_id, emp_order.order columns to produce the following output.

TABLE 4

Final result

| emp_salary.emp_id | emp_order.order |
|---|---|
| 1 | 100 |
| 2 | 1000 |
| 3 | 500 |
| 4 | 800 |
| 5 | 800 |
| 6 | 600 |
| 7 | 500 |

The first embodiment of the invention optimizes the given query within a database compiler as follows:

Q2:

SELECT emp_id, order FROM employee_order WHERE emp_id IS NOT NULL;

This produces the following result, which can be seen as being the same as that produced by the non-optimized version.

TABLE 5

Final result

| emp_id | order |
|---|---|
| 1 | 100 |
| 2 | 1000 |
| 3 | 500 |
| 4 | 800 |
| 5 | 800 |
| 6 | 600 |
| 7 | 500 |

The accuracy of this optimization depends on the fact that, with respect to the OUTER JOIN predicate 312, that is emp_salary.emp_id=emp_order.emp_id, the left quantifier 306, that is employee_order corresponds with one row and only one row from the table represented by the right quantifier 308, that is employee. In the absence of a correspondence, the values associated with columns quantified by the right quantifier 308 are nulls. Since no column quantified by the right quantifier 308 is projected out, the query's result is indiscriminate with respect to a correspondence or the absence of a correspondence. Therefore, the right quantifier 308 can be eliminated from the query. The query result is hence one row per input tuple of the left quantifier, which is equivalent to a simple select over the left quantifier.

Figure 4A:
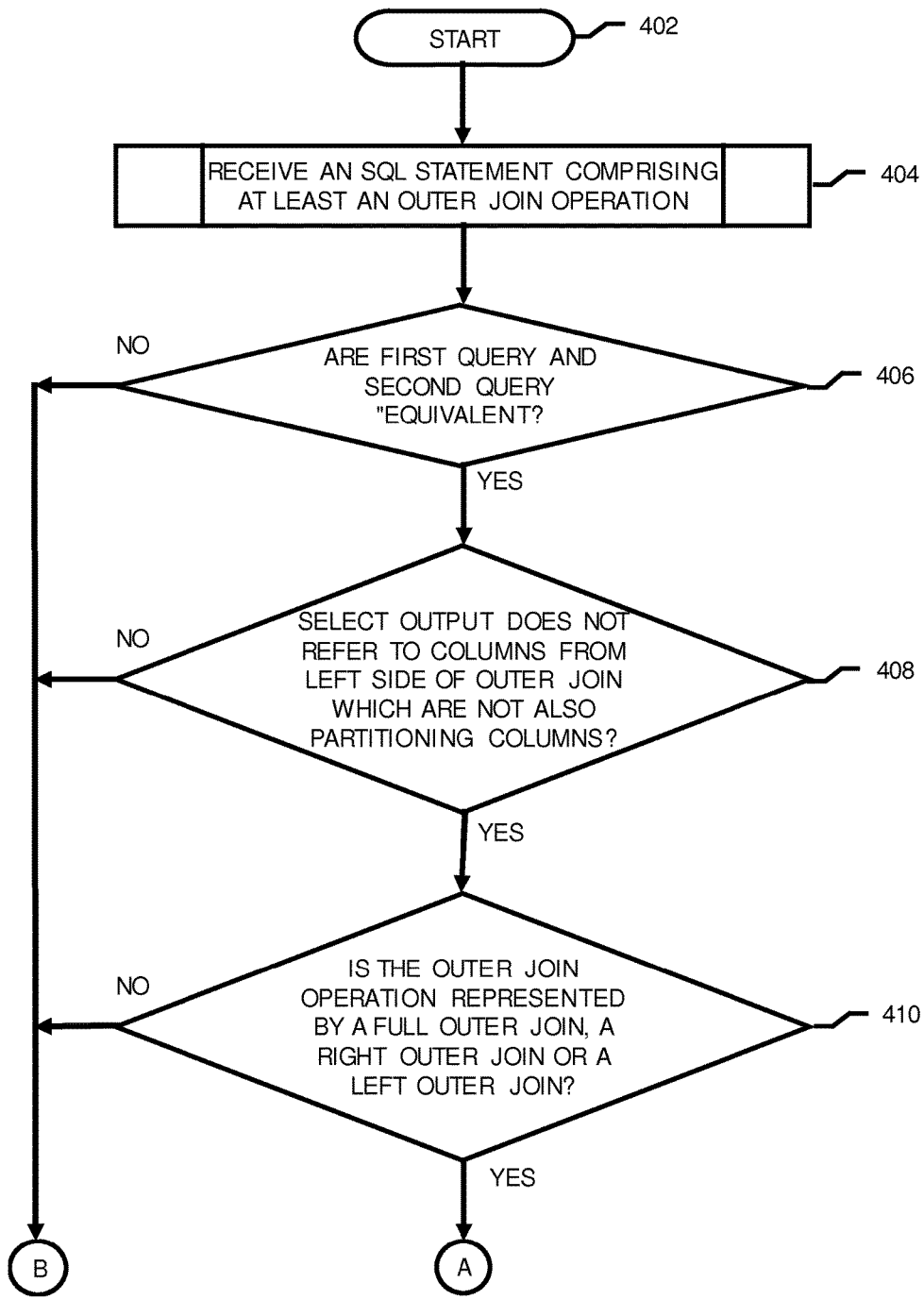
FIGS. 4A and 4B show a flow diagram of a first embodiment of a method according to the invention.

FIG. 4 shows a flow diagram of a first embodiment of a method of processing a query in a database management system, the query comprising at least an OUTER JOIN operation. Referring to FIG. 4A, the method starts at step 402. At step 404, query processor 120 receives an SQL statement comprising at least an OUTER JOIN operation.

At step 406, query processor 120 determines whether the first query 302 and the second query 304 are exactly "equivalent" the first 302 and second 304 queries being respectively the left side and the right side operands of the OUTER JOIN operation. Two queries, or subqueries, are "equivalent" if they produce the same multi-set results. A multi-set is a collection of unordered objects that may include duplicate objects. The results of an SQL query, for example, is generally a multi-set unless it has been specified that the query returns distinct and/or ordered results. In the example of the first embodiment, the check for whether the first query 302 and the second query 304 are exactly "equivalent" is between (SELECT * FROM employee_order) and (SELECT emp_id,salary FROM employee). Although employee_order table does not contain a salary column, each row in (SELECT * FROM employee_order) is equivalent to one row and only one row from the second query (SELECT emp_id, salary FROM employee). Responsive to a negative determination, processing proceeds through connector B to step 414 in FIG. 4B and the method ends. Responsive to a positive determination, processing proceeds to step 408.

In some instances, the check at step 406 can be relaxed. Techniques to validate equivalence of multi-set results may be adopted in commercial database compilers, and it can be detected when a specific multi-set contains or is contained by another multi-set.

At step 408, query processor 120 determines whether the SELECT output of the query does not refer to database columns from the left side of the OUTER JOIN (emp_salary.emp_id and emp_order.emp_id) which are not also partitioning columns (emp_salary.emp_id and emp_order.emp_id) of the OUTER JOIN operation. The SELECT output refers to the emp_id and order columns. Responsive to a negative determination, processing proceeds through connector B to step 414 in FIG. 4B and the method ends. Responsive to a positive determination, processing proceeds to step 410.

At step 410, query processor 120 checks whether the OUTER JOIN operation is represented as one of a FULL OUTER JOIN, a RIGHT OUTER JOIN or a LEFT OUTER JOIN. Responsive to a negative determination, processing proceeds through connector B to step 414 in FIG. 4B and the method ends. Responsive to a positive determination, processing proceeds through connector A to step 412.

Figure 4B:
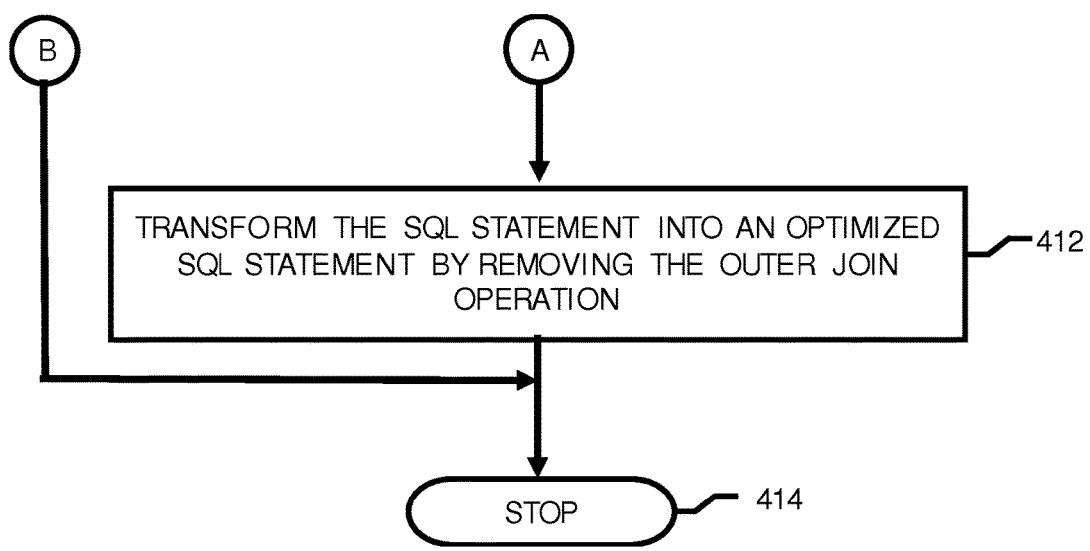

Referring to FIG. 4B, at step 412, responsive to determining, at step 406 that the first query and a second query are "equivalent", at step 408 that the SELECT output of the query does not refer to database columns from the left side of the OUTER JOIN operation which are not also partitioning columns of the OUTER JOIN operation, and at step 410 that the OUTER JOIN operation is represented as one of a FULL OUTER JOIN, a RIGHT OUTER JOIN or a LEFT OUTER JOIN, query processor 120 transforms the SQL statement into an optimized query SQL statement by removing the OUTER JOIN operation 310 and the right quantifier 304 from the SQL statement. This results in a statement of:

SELECT emp_salary.emp_id, emp_order.order
   FROM
      (SELECT * FROM employee_order) AS emp_order Removing the emp_order alias, replacing emp_salary.emp_id with the corresponding column emp_order.emp_id and adding the condition that emp_id IS NOT NULL simplifies the query to:

SELECT emp_id, order FROM employee_order WHERE emp_ID IS NOT NULL

The method ends at step 412.

To formulate a more general definition provided by the first embodiment, an outer join can be removed from an SQL statement that includes a first query and a second query, wherein the first query and second query are respectively the left side and the right side operands of a OUTER JOIN operation, wherein the OUTER JOIN operation may include a FULL OUTER JOIN, a LEFT OUTER JOIN or a RIGHT OUTER JOIN, if:

(1) the two queries are exactly "equivalent";

(2) the select output does not refer to any columns from the left side of the outer join except for the partitioning columns of the outer join; and (3) the outer join operation is represented by a full outer join, a right outer join or a left outer join.

In a second embodiment of the invention, an equality operation over multiple distinct aggregation may be optimized. If the left hand qualifier will still correspond with one row and only one row from the table represented by the right quantifier, then OUTER JOIN elimination can still be performed. The following query Q3 is an example of a query that may be optimized using the second embodiment.

Q3:

SELECT emp_salary.emp_id, min_salary, max_salary, sum_salary
    FROM
        (SELECT emp_id, MIN(DISTINCT salary) AS
min_salary, MAX(DISTINCT salary) AS max_salary, SUM(salary) AS sum_salary
            FROM employee GROUP BY emp_id) AS emp_salary
        FULL OUTER JOIN
            (SELECT * FROM employee_order) AS emp_order
                ON emp_salary.emp_id = emp_order.emp_id;

Starting with the (SELECT emp_id, MIN (DISTINCT salary) AS min_salary, MAX(DISTINCT salary) AS max_salary, SUM(salary) AS sum_salary FROM employee GROUP BY emp_id) AS emp_salary portion, this selects four items from the employee table and groups them by emp_id. The first column selected is emp_id. The second selection is MIN (DISTINCT salary) which is the minimum value in the salary column and is given an alias of min_salary. The third selection is MAX (DISTINCT salary) which is the maximum value in the salary column and is given an alias of max_salary. The fourth selection is SUM (salary) which is the total of all entries for the salary column and is given the alias sum_salary.

The (SELECT * FROM employee_order) AS emp_order portion selects all columns from the employee_order table and creates a table alias of emp_order for the selection.

The FULL OUTER JOIN portion joins records in both tables, putting a NULL Value in every column of the table that lacks a matching row. In this example, there are no columns in the table which lack a matching row.

The ON emp_salary.emp_id=emp_order.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The SELECT emp_salary.emp_id, min_salary, max_salary, sum_salary FROM portion selects only the emp_salary.emp_id, min_salary, max_salary and sum_salary columns to produce the following output:

TABLE 6

Final result

| emp_salary.emp_id | min_salary | max_salary | sum_salary |
|---|---|---|---|
| 1 | 1000 | 1000 | 1000 |
| 2 | 2000 | 2000 | 2000 |
| 3 | 3000 | 3000 | 3000 |
| 4 | 1000 | 1000 | 1000 |
| 5 | 3000 | 3000 | 3000 |
| 6 | 4000 | 4000 | 4000 |
| 7 | 5000 | 5000 | 5000 |

The second embodiment of the invention optimizes the given query within a database compiler as follows:

Q4:

SELECT emp_id, MIN(DISTINCT salary) OVER (PARTITION BY emp_id) AS min_salary,
    MAX(DISTINCT salary) OVER (PARTITION BY emp_id) AS max_salary,
    SUM(salary) OVER (PARTITION BY emp_id) AS sum_salary
    FROM employee
    WHERE emp_id IS NOT NULL;

This produces the following result, which can be seen as being the same as that produced by the non-optimized version:

TABLE 7

Final result

| emp_id | min_salary | max_salary | sum_salary |
|---|---|---|---|
| 1 | 1000 | 1000 | 1000 |
| 2 | 2000 | 2000 | 2000 |
| 3 | 3000 | 3000 | 3000 |
| 4 | 1000 | 1000 | 1000 |
| 5 | 3000 | 3000 | 3000 |
| 6 | 4000 | 4000 | 4000 |
| 7 | 5000 | 5000 | 5000 |

Figure 5A:
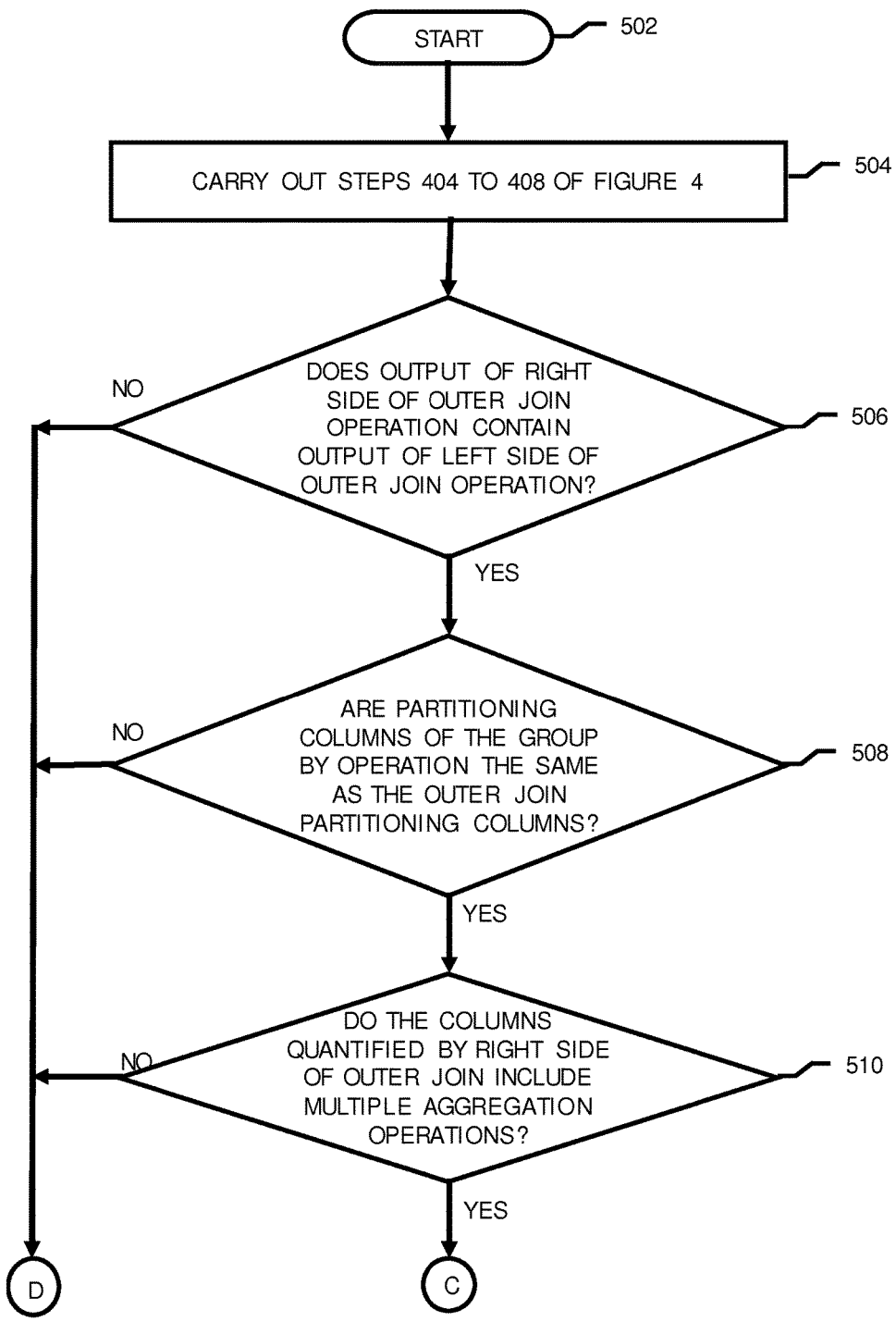
FIGS. 5A and 5B show a flow diagram of a second embodiment of a method according to the invention.

FIG. 5 shows a flow diagram of the second embodiment of a method of processing a query in a database management system, the query comprising at least an OUTER JOIN operation and in which the columns quantified by the left side of the outer join include multiple distinct aggregation operations, if for the left quantifier will still correspond one row and only one row from the table represented by the right quantifier. Referring to FIG. 5A, the method starts at step 502.

At step 504, query processor 120 carries out steps 404 to 408 of FIG. 4, as previously discussed. If steps 406 or 408 have a negative response, then processing proceeds, as in FIG. 4, to step 414 and the method ends. At step 408 of FIG. 4, if there is a positive response, then in the second embodiment, processing proceeds to step 506.

At step 506, query processor 120 determines whether the output of the right side of the OUTER JOIN operation contains the output of the left side of the OUTER JOIN operation. The output of the right side of the OUTER JOIN operation is all of the columns from the employee_order table. The output of the left side of the OUTER JOIN operation is the emp_id, MIN(DISTINCT salary), MAX (DISTINCT salary) and SUM (salary) columns from the employee table. Responsive to a negative determination, processing proceeds through connector D to step 414 in FIG. 5B and the method ends. Responsive to a positive determination, processing proceeds to step 508. At step 508, query processor 120 determines whether the partitioning columns of the GROUP BY operation are the same as the OUTER JOIN partitioning columns. The partitioning columns (only one) of the GROUP BY operation is emp_id. The OUTER JOIN partitioning columns are emp_salary.emp_id and emp_order.emp_id. Responsive to a negative determination, processing proceeds through connector D to step 414 in FIG. 5B and the method ends. Responsive to a positive determination, processing proceeds to step 510. At step 510, query processor 120 determines whether the columns quantified by the right side of the OUTER JOIN operation include one or both of multiple distinct aggregation operations or multiple aggregation operations. The columns quantified by the right side of the OUTER JOIN operation are emp_id, MIN (DISTINCT salary), MAX (DISTINCT salary) and SUM (salary). Responsive to a negative determination, processing proceeds through connector D to step 414 in FIG. 5B and the method ends. Responsive to a positive determination, processing proceeds through connector C to step 512 in FIG. 5B.

Figure 5B:
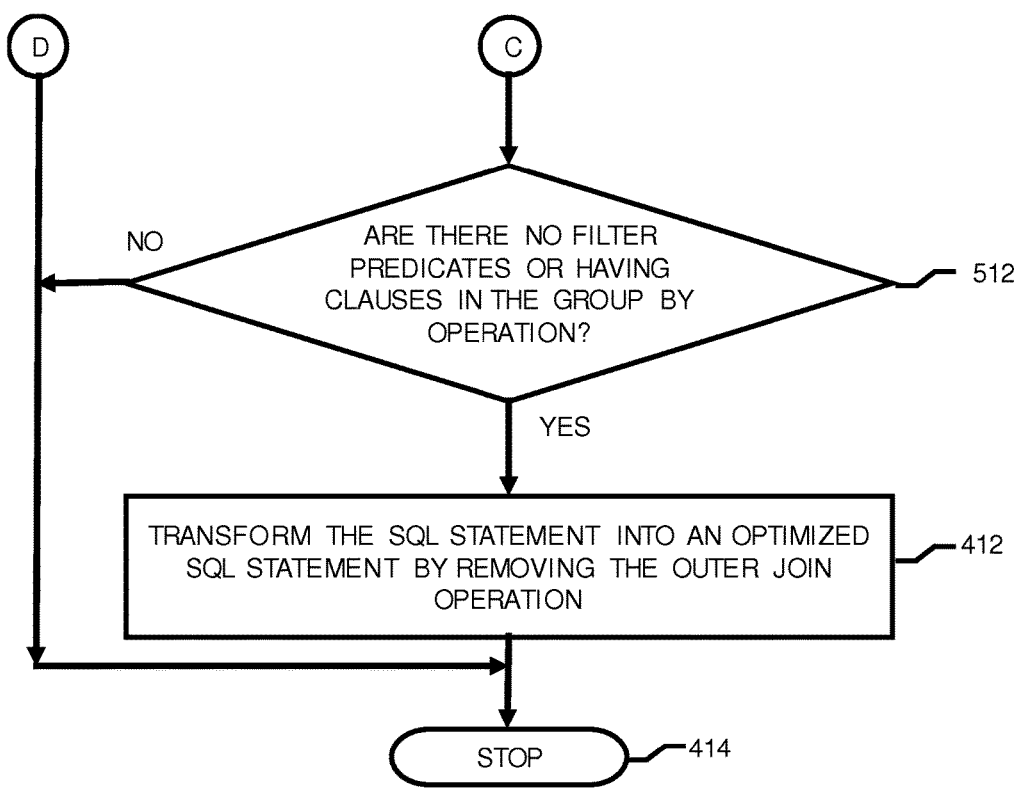

Referring to FIG. 5B, at step 512, query processor 120 determines whether there are no filter predicates or having clause in the GROUP BY operation. Responsive to a negative determination, processing proceeds to step 414 and the method ends. Responsive to a positive determination, processing proceeds to step 412, which has been described above with reference to the first embodiment.

At step 412, query processor 120 transforms the SQL statement into an optimized query SQL statement by removing the OUTER JOIN operation and results in a statement of:

| Q4: |
|---|
| SELECT emp_id, MIN(DISTINCT salary) OVER (PARTITION BY emp_id)<br>AS min_salary,<br>    MAX(DISTINCT salary) OVER (PARTITION BY emp_id) AS max_salary,<br>    SUM(salary) OVER (PARTITION BY emp_id) AS sum_salary<br>    FROM employee<br>    WHERE emp_id IS NOT NULL; |

The method ends at step 414.

To formulate a more general definition provided by the second embodiment, an outer join can be removed from an SQL statement that includes a first query and a second query, wherein the first query and second query are respectively the left side and the right side operands of a OUTER JOIN operation, wherein the OUTER JOIN operation may include a FULL OUTER JOIN, a LEFT OUTER JOIN or a RIGHT OUTER JOIN, and the columns quantified by the right side of the outer join can include multiple distinct aggregation operations, multiple aggregation operations or a composition of both, if:

(1) the two queries are "equivalent";
  (2) the output of the right side of the outer join contains the output of the left side of the outer join;
  (3) the select output does not refer to any columns from the left side of the outer join except for the outer join partitioning columns;
  (4) the partitioning columns of the group by operation are the same as the outer join partitioning columns;
  (5) the columns quantified by the right side of the outer join can include multiple distinct aggregation operations, multiple aggregation operations or a composition of both;
  (6) there is no filter predicates or having clause in the group by operation; and
  (7) the outer join operation is represented by a full outer join, a right outer join or a left outer join.

In a third embodiment of the invention, an equality operation over multiple distinct aggregation with GROUP BY may be optimized. When the output quantified by the left side of the OUTER JOIN contains the output quantified by the right side of the OUTER JOIN where the provided gap is supported by a GROUP BY operation, it is still possible to perform OUTER JOIN elimination. The following query Q5 is an example of a query that may be optimized using the third embodiment.

| Q5: |
|---|
| SELECT emp_salary.emp_id, min_salary, max_salary, sum_salary<br>    FROM<br>    (SELECT emp_id, MIN(DISTINCT salary) AS min_salary,<br>MAX(DISTINCT salary) AS max_salary, SUM(salary) AS sum_salary<br>    FROM employee GROUP BY emp_id) AS emp_salary<br>FULL OUTER JOIN<br>    (SELECT emp_id, AVG(DISTINCT order) AS avg_order FROM employee_order GROUP BY emp_id) AS emp_order<br>    ON emp_salary.emp_id = emp_order.emp_id; |

Starting with the (SELECT emp_id, MIN (DISTINCT salary) AS min_salary, MAX(DISTINCT salary) AS max_salary, SUM(salary) AS sum_salary FROM employee GROUP BY emp_id) AS emp_salary portion, this selects four columns from the employee table, creates a table alias of emp_salary for the selection and groups them by emp_id.

The (SELECT emp_id, AVG (DISTINCT order) AS avg_order FROM employee_order GROUP BY emp_id portion selects two columns from the employee_order table, creates a table alias of avg_order for the selection and groups the result by emp_id.

The FULL OUTER JOIN portion joins records in both tables, putting a NULL Value in every column of the table that lacks a matching row. In this example, there are no columns in the table which lack a matching row.

The ON emp_salary.emp_id=emp_order.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The SELECT emp_salary.emp_id, min_salary, max_salary, sum_salary FROM portion selects only the emp_salary.emp_id, min-salary, max_salary and sum_salary columns to produce the following output:

TABLE 8

| Final result | | | |
|---|---|---|---|
| emp_salary.emp_id | min_salary | max_salary | sum_salary |
| 1 | 1000 | 1000 | 1000 |
| 2 | 2000 | 2000 | 2000 |
| 3 | 3000 | 3000 | 3000 |
| 4 | 1000 | 1000 | 1000 |
| 5 | 3000 | 3000 | 3000 |
| 6 | 4000 | 4000 | 4000 |
| 7 | 5000 | 5000 | 5000 |

The third embodiment of the invention optimizes the given query within a database compiler as follows:

Q6:

```
SELECT emp_id, MIN(DISTINCT salary) OVER (PARTITION BY
emp_id)
AS min_salary,
    MAX(DISTINCT salary) OVER (PARTITION BY emp_id) AS
max_salary,
    SUM(salary) OVER (PARTITION BY emp_id) AS sum_salary
    FROM employee WHERE emp_id IS NOT NULL;
```

This produces the following result, which can be seen as being the same as that produced by the non-optimized version.

TABLE 9

Final result

| emp_id | min_salary | max_salary | sum_salary |
|---|---|---|---|
| 1 | 1000 | 1000 | 1000 |
| 2 | 2000 | 2000 | 2000 |
| 3 | 3000 | 3000 | 3000 |
| 4 | 1000 | 1000 | 1000 |
| 5 | 3000 | 3000 | 3000 |
| 6 | 4000 | 4000 | 4000 |
| 7 | 5000 | 5000 | 5000 |

Figure 6:
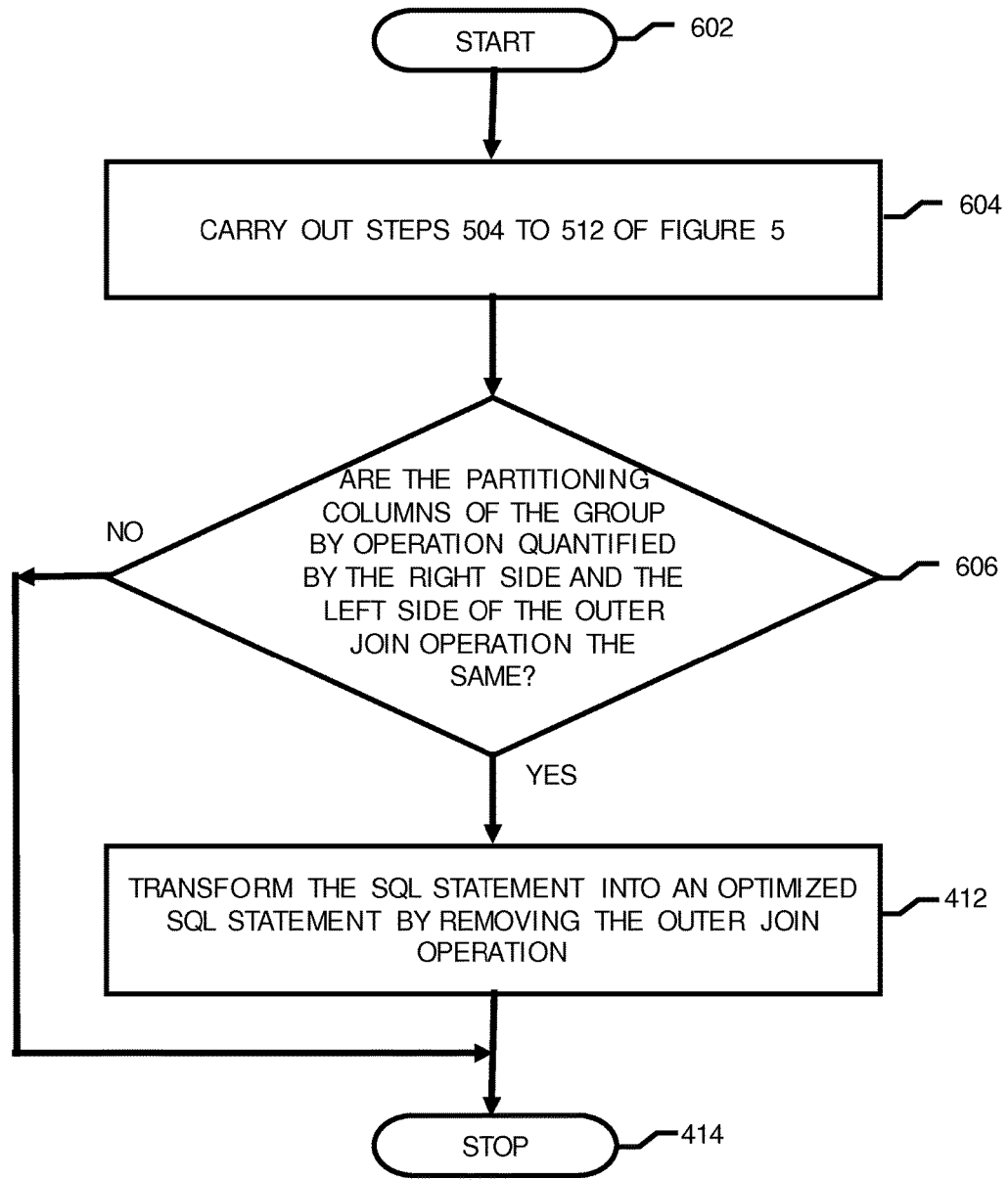
FIG. 6 shows a flow diagram of a third embodiment of a method according to the invention.

FIG. 6 shows a flow diagram of a third embodiment of a method of processing a query in a database management system, the query comprising at least an OUTER JOIN operation and in which the output quantified by the left side of the outer join contains the output quantified by the right side of the outer join where the provided gap is supported by a group by operation. The method starts at step 602.

At step 604, query processor 120 carries out steps 504 to 512 of FIG. 5. If step 406, step 408 (carried out as part of step 504) or steps 506 to 512 have a negative response, then processing proceeds, as in FIG. 4, to step 414 and the method ends. At step 512 of FIG. 5, if there is a positive response, then in the third embodiment, processing proceeds to step 606. At step 606, query processor 120 determines whether the partitioning columns (emp_id) of the GROUP BY operation quantified by the right side of the OUTER JOIN operation are the same as the partitioning columns (emp_id) of the GROUP BY operation quantified by the left side of the OUTER JOIN operation. Responsive to a negative determination, processing proceeds to step 414 and the method ends. Responsive to a positive determination, processing proceeds to step 412 which has been described above with reference to the first embodiment.

At step 412, query processor 120 transforms the SQL statement into an optimized query SQL statement by removing the OUTER JOIN operation and results in a statement of:

Q6:

```
SELECT emp_id, MIN(DISTINCT salary) OVER (PARTITION BY
emp_id)
AS min_salary,
    MAX(DISTINCT salary) OVER (PARTITION BY emp_id) AS
max_salary,
    SUM(salary) OVER (PARTITION BY emp_id) AS sum_salary
    FROM employee WHERE emp_id IS NOT NULL;
```

The method ends at step 414.

To formulate a more general definition provided by the third embodiment, an outer join can be removed from an SQL statement that includes a first query and a second query, wherein the first query and second query are respectively the left side and the right side operands of a OUTER JOIN operation, wherein the OUTER JOIN operation may include a FULL OUTER JOIN, a LEFT OUTER JOIN or a RIGHT OUTER JOIN, and the output quantified by the left side of the outer join contains the output quantified by the right side of the outer join where the provided gap is supported by a group by operation, if:

(1) the two queries are "equivalent";
(2) the output of the right side of the outer join contains the output of the left side of the outer join;
(3) the select output does not refer to any columns from the left side of the outer join except for the outer join partitioning columns;
(4) the partitioning columns of the group by operation are the same as the outer join partitioning columns;
(5) the columns quantified by the right side of the outer join can include multiple distinct aggregation operations, multiple aggregation operations or a composition of both;
(6) the partitioning columns of the group by quantified by the right side of the outer join are the same as the partitioning columns of the group by quantified by the left side of the outer join;
(7) there is no filter predicates or having clause in any group by operation; and
(8) the outer join operation is represented by a full outer join, a right outer join or a left outer join.

In a fourth embodiment of the invention, an equality operation without match may be optimized. In the case where the two queries are still "equivalent" but the output quantified by the left side of the outer join does not match the output quantified by the right side of the outer join, outer join elimination may still be performed. In the following example, the output quantified by the right side of the outer join contains information only about employee ID 4, and the output quantified by the left side of the outer join contains information about all the employees. The following query Q7 is an example of a query that may be optimized using the third embodiment.

Q7:

```
SELECT emp_salary.emp_id, max_salary
    FROM
    (SELECT emp_id, MAX(DISTINCT salary) AS max_salary
        FROM employee GROUP BY emp_id) AS emp_salary
    RIGHT OUTER JOIN
    (SELECT * FROM employee_order WHERE emp_id = 4) AS
emp_order
        ON emp_salary.emp_id = emp_order.emp_id;
```

Starting with the (SELECT emp_id, MAX (DISTINCT salary) AS max_salary FROM employee GROUP BY emp_id) AS emp_salary portion, this selects two columns from the employee table and creates a table alias of emp_salary for the selection.

The (SELECT * FROM employee_order WHERE emp_id=4) AS emp_order portion selects all the columns where the emp_id is 4 from the employee_order table and creates a table alias of emp_order for the selection.

The RIGHT OUTER JOIN portion joins records in both tables, putting a NULL value in every column of the left table that lacks a matching row in the right table. In this example, there are no columns in the table which lack a matching row.

The ON emp_salary.emp_id=emp_order.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The SELECT emp_salary.emp_id, max_salary FROM portion selects only the emp_salary.emp_id and max_salary columns to produce the following output.

TABLE 10

| Final result | |
| --- | --- |
| emp_salary.emp_id | max_salary |
| 4 | 1000 |

The fourth embodiment of the invention optimizes the given query within a database compiler as follows:

| Q8: |
| --- |
| SELECT emp_id, MAX(DISTINCT salary) OVER (PARTITION BY emp_id)<br>   FROM employee WHERE emp_id = 4; |

This produces the following result, which can be seen as being the same as that produced by the non-optimized version:

TABLE 11

| Final result | |
| --- | --- |
| emp_id | max_salary |
| 4 | 1000 |

Figure 7A:
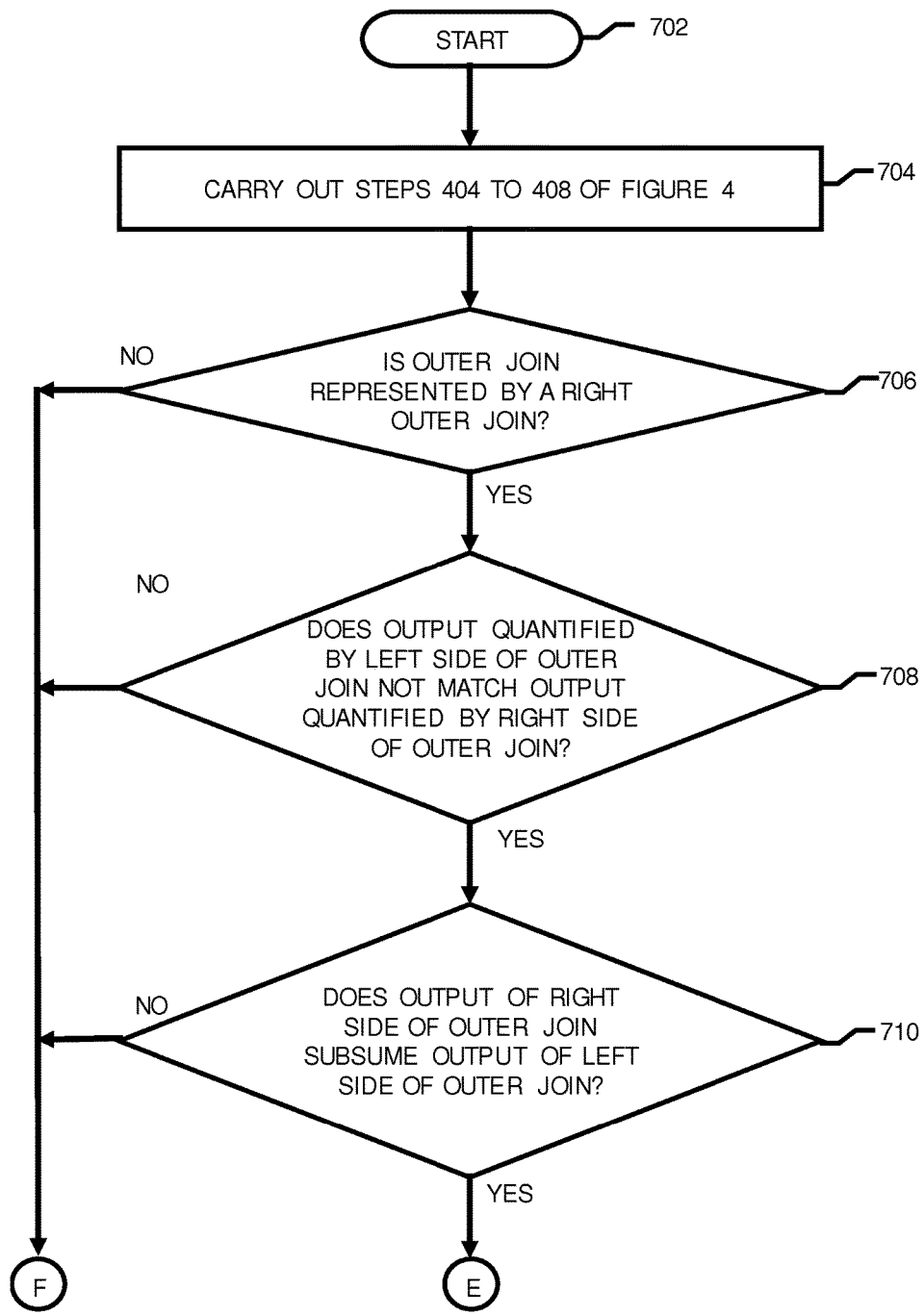
FIGS. 7A and 7B show a flow diagram of a fourth embodiment of a method according to the invention.

FIG. 7 shows a flow diagram of a fourth embodiment of a method of processing a query in a database management system, the query comprising at least an OUTER JOIN operation and in which the two queries are still "equivalent" but the output quantified by the left side of the outer join does not match the output quantified by the right side of the outer join. Referring to FIG. 7A the method starts at step 702. At step 704, query processor 120 carries out steps 404 to 408 of FIG. 4. If steps 406 or 408 have a negative response, then processing proceeds, as in FIG. 4, to step 414 and the method ends. At step 408 of FIG. 4, if there is a positive response, then in the fourth embodiment, processing proceeds to step 706.

At step 706, query processor 120 determines whether the outer join is represented by a right outer join. Responsive to a negative determination, processing proceeds through connector F to step 414 in FIG. 7B and the method ends. Responsive to a positive determination, processing proceeds to step 708. At step 708, query processor 120 determines whether the output quantified by the left side of the OUTER JOIN does not match the output quantified by the right side of the OUTER JOIN. Responsive to a negative determination, processing proceeds through connector F to step 414 in FIG. 7B and the method ends. Responsive to a positive determination, processing proceeds to step 710. At step 710, query processor 120 determines whether the output of the right side of the OUTER JOIN operation subsumes the output of the left side of the OUTER JOIN operation. Responsive to a negative determination, processing proceeds through connector F to step 414 in FIG. 7B and the method ends. Responsive to a positive determination, processing proceeds through connector E to step 712 in FIG. 7B.

Figure 7B:
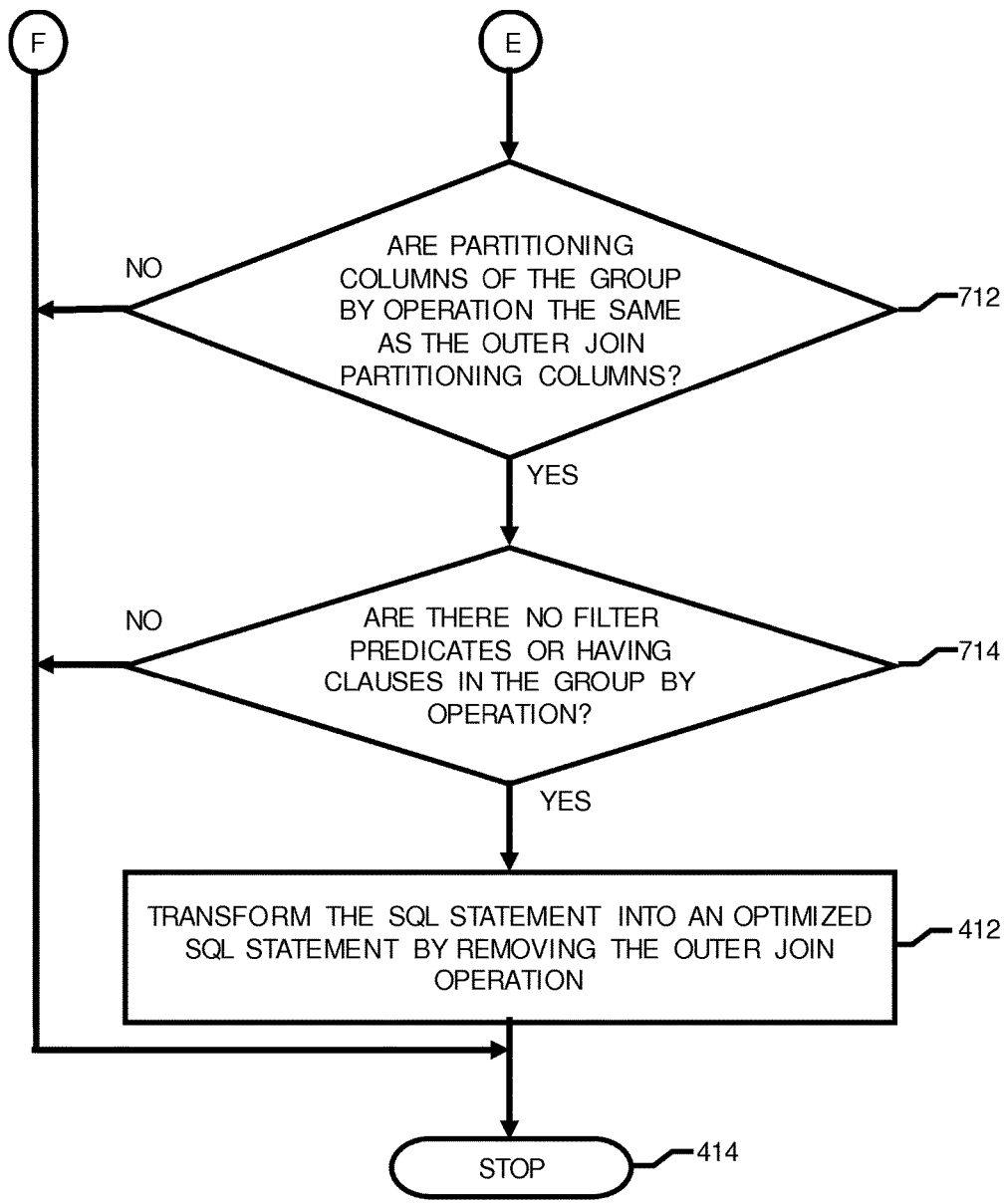

Referring to FIG. 7B, at step 712, query processor 120 determines whether the partitioning columns of the GROUP BY operation are the same as the OUTER JOIN partitioning columns. Responsive to a negative determination, processing proceeds to step 414 and the method ends. Responsive to a positive determination, processing proceeds to step 714. At step 714, query processor 120 determines whether there are no filter predicates or having clause in the GROUP BY operation. Responsive to a negative determination, processing proceeds to step 414 and the method ends. Responsive to a positive determination, processing proceeds to step 412.

At step 412, query processor 120 transforms the SQL statement into an optimized query SQL statement by removing the OUTER JOIN operation and results in a statement of:

| Q8: |
| --- |
| SELECT emp_id, MAX(DISTINCT salary) OVER (PARTITION BY emp_id)<br>   FROM<br>      employee WHERE emp_id=4; |

To formulate a more general definition provided by the fourth embodiment, an outer join can be removed from an SQL statement that includes a first query and a second query, wherein the first query and second query are respectively the left side and the right side operands of a OUTER JOIN operation, wherein the OUTER JOIN operation is represented by a RIGHT OUTER JOIN, and the output quantified by the left side of the outer join does not match the output quantified by the right side of the outer join, if:

(1) the two queries are "equivalent";
(2) the output of the right side of the outer join subsumes the output of the left side of the outer join;
(3) the select output does not refer to any columns from the left side of the outer join except for the outer join partitioning columns;
(4) the partitioning columns of the group by operation are the same as the outer join partitioning columns;
(5) the columns quantified by the right side of the outer join can include multiple distinct aggregation operations, multiple aggregation operations and/or a composition of both;
(6) there is no filter predicates or having clause in the group by operation; and
(7) the outer join operation is represented by a right outer join.

In a fifth embodiment of the invention, a filter predicate over multiple DISTINCT aggregation may be optimized. If the SQL statement has a filter predicate on the multiple distinct aggregation output, it is still possible to perform the OUTER JOIN elimination by evaluating the predicate in a later stage. The following query Q9 is an example of a query that may be optimized using the fifth embodiment:

| Q9: |
| --- |
| SELECT emp_salary.emp_id, max_salary<br>   FROM<br>      (SELECT emp_id, MAX(DISTINCT salary) AS max_salary<br>         FROM employee GROUP BY emp_id) AS emp_salary<br>   LEFT OUTER JOIN |

```
        (SELECT * FROM employee_order) AS emp_order
            ON emp_salary.emp_id = emp_order.emp_id WHERE
    max_salary > 2000;
```

Starting with the (SELECT emp_id, MAX (DISTINCT salary) AS max_salary FROM employee GROUP BY emp_id) AS emp_salary portion, this selects two columns from the employee table, groups them by emp_id and creates a table alias of emp_order for the selection.

The (SELECT * FROM employee_order) AS emp_order portion selects all the columns from the employee_order table and creates a table alias of emp_order for the selection.

The LEFT OUTER JOIN portion joins records in both tables, putting a NULL Value in every column of the right table that lacks a matching row in the left table. In this example, there are no columns in the table which lack a matching row.

The ON emp_salary.emp_id=emp_order.emp_id WHERE max_salary>2000 predicate 312 portion applies a condition to the rows which are selected, meaning that the rows for which emp_id in each of the two tables are not equal and the rows for which max_salary is not greater than 2000 are not selected.

The SELECT emp_salary.emp_id, max_salary FROM portion selects only the emp_salary.emp_id and max_salary columns to produce the following output:

TABLE 12

| Final result | |
| --- | --- |
| emp_salary.emp_id | max_salary |
| 3 | 3000 |
| 5 | 3000 |
| 6 | 4000 |
| 7 | 5000 |

The fifth embodiment of the invention optimizes the given query within a database compiler as follows:

```
                              Q10:
SELECT emp_id, MAX(DISTINCT salary) AS max_salary
    FROM employee WHERE emp_id IS NOT NULL
    GROUP BY emp_id HAVING MAX(DISTINCT salary) > 2000;
```

This produces the following result, which can be seen as being the same as that produced by the non-optimized version:

TABLE 13

| Final result | |
| --- | --- |
| emp_id | max_salary |
| 3 | 3000 |
| 5 | 3000 |
| 6 | 4000 |
| 7 | 5000 |

Figure 8:
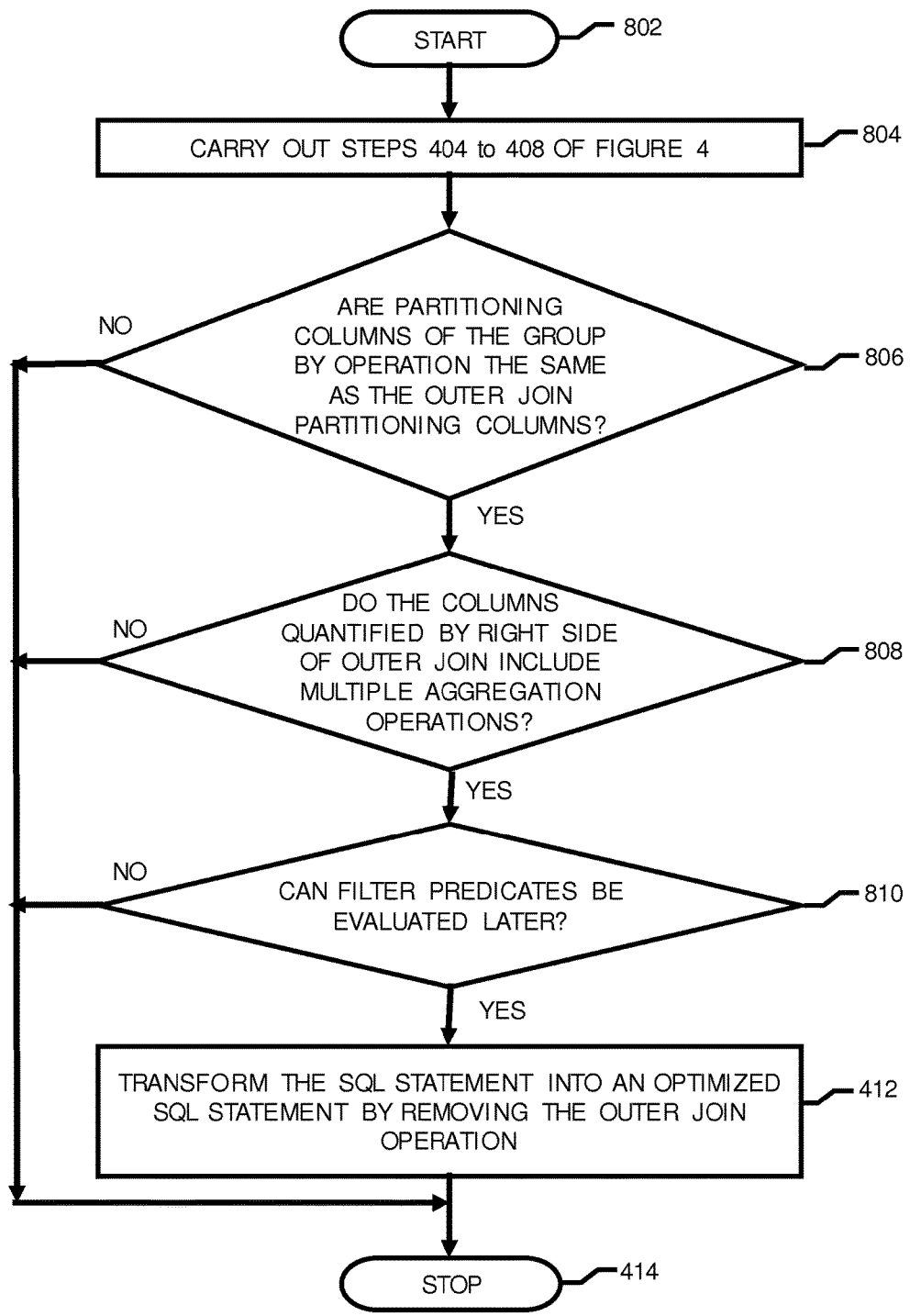
FIG. 8 shows a flow diagram of a fifth embodiment of a method according to the invention.

FIG. 8 shows a flow diagram of a fifth embodiment of a method of processing a query in a database management system, the query comprising at least an OUTER JOIN operation and in which the SQL statement has a filter predicate on the multiple distinct aggregation output. Referring to FIG. 8, the method starts at step 802. At step 804, query processor 120 carries out steps 404 to 408 of FIG. 4. If steps 406 or 408 have a negative response, then processing proceeds, as in FIG. 4, to step 414 and the method ends. At step 408 of FIG. 4, if there is a positive response, then in the fifth embodiment, processing proceeds to step 806.

At step 806, query processor 120 determines whether the partitioning columns (emp_id) of the GROUP BY operation are the same as the OUTER JOIN partitioning columns (emp_salary.emp_id and emp_order.emp_id)). Responsive to a negative determination, processing proceeds to step 414 in FIG. 8 and the method ends. Responsive to a positive determination, processing proceeds to step 808.

At step 808, query processor 120 determines whether the columns (*, that is all) quantified by the right side of the OUTER JOIN include one or more of multiple distinct aggregation operations or multiple aggregation operations (salary). Responsive to a negative determination, processing proceeds to step 414 and the method ends. Responsive to a positive determination, processing proceeds to step 810.

At step 810, query processor 120 determines whether the filter predicate can be evaluated later. Responsive to a negative determination, processing proceeds to step 414 and the method ends. Responsive to a positive determination, processing proceeds to step 412.

At step 412, query processor 120 transforms the SQL statement into an optimized query SQL statement by removing the OUTER JOIN operation and results in a statement of:

```
                              Q8:
SELECT emp_id, MAX(DISTINCT salary) AS max_salary
    FROM employee WHERE emp_id IS NOT NULL
    GROUP BY emp_id HAVING MAX(DISTINCT salary) > 2000
```

To formulate a more general definition provided by the fifth embodiment, an outer join can be removed from an SQL statement that includes a first query and a second query, wherein the first query and second query are respectively the left side and the right side operands of a OUTER JOIN operation, wherein the OUTER JOIN operation is a LEFT OUTER JOIN, if:

(1) the two queries are exactly "equivalent";

(2) the select output does not refer to any columns from the left side of the outer join except for the outer join partitioning columns;

(3) the partitioning columns of the group by operation are the same as the outer join partitioning columns;

(4) the columns quantified by the right side of the outer join can include multiple distinct aggregation operations, multiple aggregation operations or a composition of both;

(5) the filter predicate can be evaluated later; and (6) the outer join operation is represented by a full outer join, a right outer join or a left outer join.

In a sixth embodiment of the invention, a HAVING clause on the multiple DISTINCT aggregation operation may be optimized. If the SQL statement has a having clause on the multiple distinct aggregation output, it is still possible to perform the outer join elimination by evaluating the having clause in a later stage. The following query Q11 is an example of a query that may be optimized using the sixth embodiment:

Q11:

SELECT emp_salary.emp_id, min_salary, max_salary, sum_salary
   FROM
      (SELECT emp_id, MIN(DISTINCT salary) AS min_salary,
   MAX(DISTINCT salary) AS max_salary, SUM(salary) AS sum_salary
         FROM employee GROUP BY emp_id HAVING SUM(salary)
   > 1000) AS emp_salary
      LEFT OUTER JOIN
      (SELECT * FROM employee_order) AS emp_order
         ON emp_salary.emp_id = emp_order.emp_id;

Starting with the (SELECT emp_id, MIN (DISTINCT salary) AS min_salary, MAX(DISTINCT salary) AS max_salary, SUM(salary) AS sum_salary FROM employee GROUP BY emp_id HAVING SUM(salary)>1000) AS emp_salary portion, this selects four columns from the employee table, groups them by emp_id, selects only those having SUM(salary)>1000 and creates a table alias of emp_salary for the selection.

The (SELECT * FROM employee_order) AS emp_order portion selects all the columns from the employee_order table and creates a table alias of emp_order for the selection.

The LEFT OUTER JOIN portion joins records in both tables, putting a NULL Value in every column of the right table that lacks a matching row in the left table. In this example, there are no columns in the table which lack a matching row.

The ON emp_salary.emp_id=emp_order.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The SELECT emp_salary.emp_id, min_salary, max_salary, sum_salary FROM portion selects only the emp_salary.emp_id, min_salary, max_salary and sum_salary columns to produce the following output:

TABLE 14

| | Final result | | |
|---|---|---|---|
| emp_salary.emp_id | min_salary | max_salary | sum_salary |
| 2 | 2000 | 2000 | 2000 |
| 3 | 3000 | 3000 | 3000 |
| 5 | 3000 | 3000 | 3000 |
| 6 | 4000 | 4000 | 4000 |
| 7 | 5000 | 5000 | 5000 |

The sixth embodiment of the invention optimizes the given query within a database compiler as follows:

Q12:

SELECT emp_id, MIN(DISTINCT salary) AS min_salary,
   MAX(DISTINCT salary) AS max_salary,
   SUM(salary) AS sum_salary
   FROM employee WHERE emp_id IS NOT NULL
   GROUP BY emp_id HAVING SUM(salary) > 1000;

This produces the following result, which can be seen as being the same as that produced by the non-optimized version:

TABLE 15

| | Final result | | |
|---|---|---|---|
| emp_id | min_salary | max_salary | sum_salary |
| 2 | 2000 | 2000 | 2000 |
| 3 | 3000 | 3000 | 3000 |
| 5 | 3000 | 3000 | 3000 |
| 6 | 4000 | 4000 | 4000 |
| 7 | 5000 | 5000 | 5000 |

Figure 9:
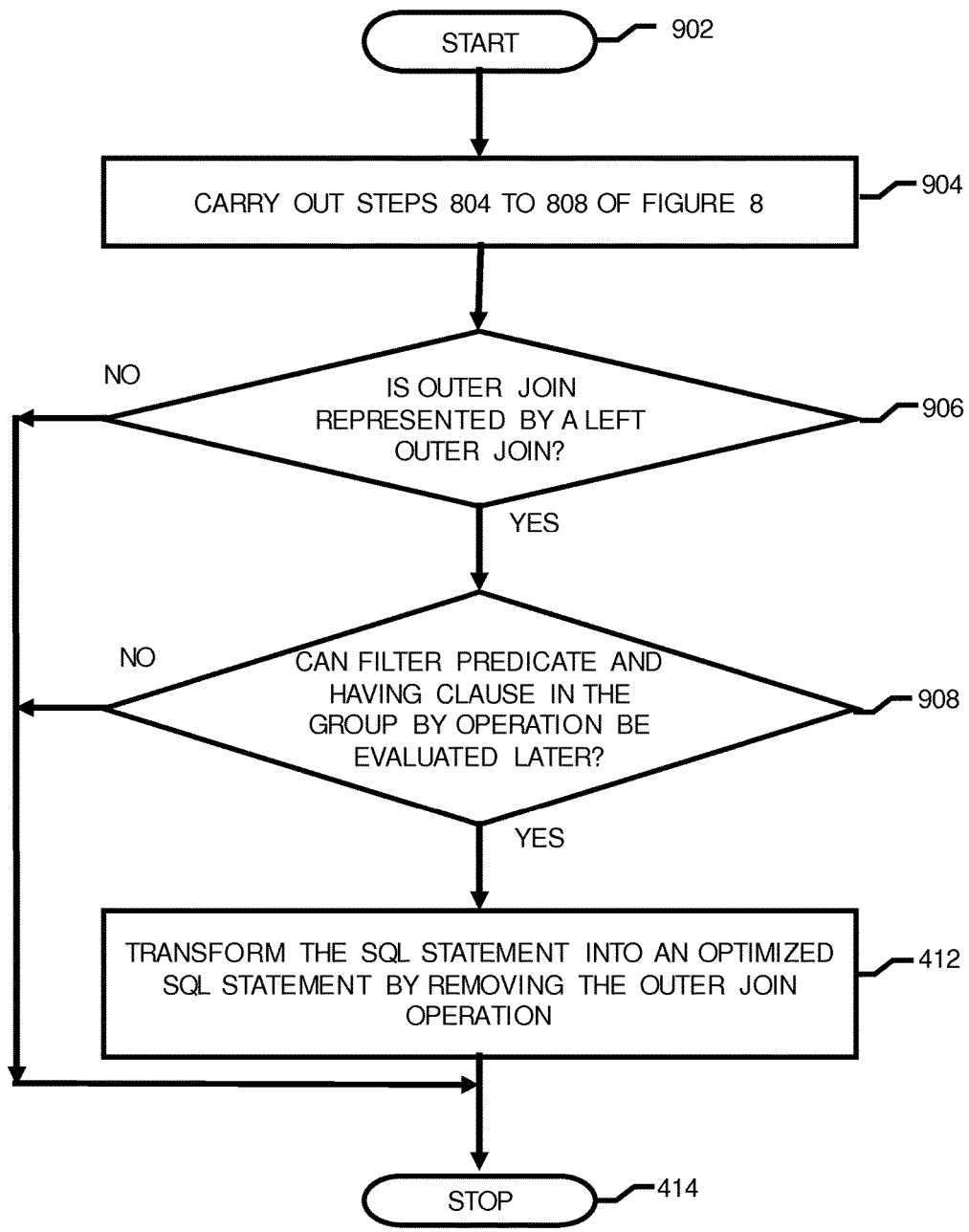
FIG. 9 shows a flow diagram of a sixth embodiment of a method according to the invention.

FIG. 9 shows a flow diagram of a sixth embodiment of a method of processing a query in a database management system, the query comprising at least a LEFT OUTER JOIN operation and in which the SQL statement has a having clause on the multiple distinct aggregation output. Referring to FIG. 9, the method starts at step 902. At step 904, query processor 120 carries out steps 804 to 808 of FIG. 4. If steps 804, 806 or 808 have a negative response, then processing proceeds, as in FIG. 4, to step 414 and the method ends. At step 808 of FIG. 8, if there is a positive response, then in the sixth embodiment, processing proceeds to step 906.

At step 906, query processor 120 determines whether the outer join is represented by a left outer join. Responsive to a negative determination, processing proceeds to step 414 and the method ends. Responsive to a positive determination, processing proceeds to step 908. At step 908, query processor 120 determines whether the filter predicate and HAVING clause in the GROUP BY operation can be evaluated later. Responsive to a negative determination, processing proceeds to step 414 and the method ends. Responsive to a positive determination, processing proceeds to step 410.

At step 412, query processor 120 transforms the SQL statement into an optimized query SQL statement by removing the OUTER JOIN operation and results in a statement of:

Q12:

SELECT emp_id, MIN(DISTINCT salary) AS min_salary,
   MAX(DISTINCT salary) AS max_salary,
   SUM(salary) AS sum_salary
   FROM employee WHERE emp_id IS NOT NULL
   GROUP BY emp_id HAVING SUM(salary) > 1000;

To formulate a more general definition provided by the sixth embodiment, an outer join can be removed from an SQL statement that includes a first query and a second query, wherein the first query and second query are respectively the left side and the right side operands of a OUTER JOIN operation, wherein the OUTER JOIN operation is represented by a LEFT OUTER JOIN, and the SQL statement has a having clause on the multiple distinct aggregation output, if:

(1) the two queries are exactly "equivalent";
(2) the select output does not refer to any columns from the left side of the outer join except for the outer join partitioning columns;
(3) the partitioning columns of the group by operation are the same as the outer join partitioning columns;
(4) the columns quantified by the right side of the outer join can include multiple distinct aggregation operations, multiple aggregation operations or a composition of both;
(5) the filter predicate and the having clause in the group by operation can be evaluated later; and
(6) the outer join operation is represented by a left outer join.

In a seventh embodiment of the invention, several forms of outer join elimination as described above in the previous embodiments are combined together to handle more complicated database statements, as for example:

Q13:

```
SELECT emp_salary.emp_id, min_salary, max_salary
   FROM
      (SELECT emp_id, MIN(salary) AS min_salary, MAX(DISTINCT salary) AS max_salary
         FROM employee GROUP BY emp_id) AS emp_salary
      FULL OUTER JOIN
      (SELECT * FROM employee_order) AS emp_order
         ON emp_salary.emp_id = emp_order.emp_id
      RIGHT OUTER JOIN
      (SELECT emp_id, order FROM employee_order WHERE emp_id = 4) AS emp_order2
         ON emp_salary.emp_id = emp_order2.emp_id
      LEFT OUTER JOIN
      (SELECT * FROM employee) AS emp
         ON emp_order2.emp_id = emp.emp_id;
```

Starting with the (SELECT emp_id, MIN (salary) AS min_salary, MAX (DISTINCT salary) AS max_salary FROM employee GROUP BY emp_id) AS emp_salary portion, this selects three columns from the employee table and groups them by emp_id and creates a table alias of emp_salary for the selection.

The (SELECT * FROM employee_order) AS emp_order portion selects all the columns from the employee_order table and creates a table alias of emp_order for the selection.

The FULL OUTER JOIN portion joins records in both tables, putting a NULL Value in every column of the table that lacks a matching row. In this example, there are no columns in the table which lack a matching row.

The ON emp_salary.emp_id=emp_order.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The (SELECT emp_id, order FROM employee_order WHERE emp_id=4) AS emp_order2 portion selects two columns where the emp_id is 4 from the employee_order table and creates a table alias of emp_order2 for the selection.

The RIGHT OUTER JOIN portion joins records in both tables, putting a NULL Value in every column of the left table that lacks a matching row in the right table. In this example, there are no columns in the table which lack a matching row.

The ON emp_salary.emp_id=emp_order2.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The (SELECT * FROM employee) AS emp portion selects all the columns from the employee table and creates a table alias of emp for the selection.

The LEFT OUTER JOIN portion joins records in both tables, putting a NULL Value in every column of the right table that lacks a matching row in the left table. In this example, there are no columns in the table which lack a matching row.

The ON emp_order2.emp_id=emp.emp_id predicate 312 portion applies a condition to the rows which are selected, meaning that the rows for which emp_id in each of the two tables are not equal are not selected. In this example there are no rows for which emp_id in each of the two tables are not equal and so all rows are selected.

The SELECT emp_salary.emp_id, min_salary, max_salary FROM portion selects only the emp_salary.emp_id, min_salary, max_salary columns to produce the following output:

TABLE 16

Final result

| emp_salary.emp_id | min_salary | max_salary |
| --- | --- | --- |
| 4 | 1000 | 1000 |

The seventh embodiment of the invention optimizes the given query within a database compiler as follows:

Q14:

```
SELECT emp_id, MIN(DISTINCT salary) OVER (PARTITION BY emp_id)
AS min_salary,
   MAX(DISTINCT salary) OVER (PARTITION BY emp_id) AS max_salary
   FROM employee WHERE emp_id = 4;
```

This produces the following result, which can be seen as being the same as that produced by the non-optimized version:

TABLE 17

Final result

| emp_id | min_salary | max_salary |
| --- | --- | --- |
| 4 | 1000 | 1000 |

Figure 10:
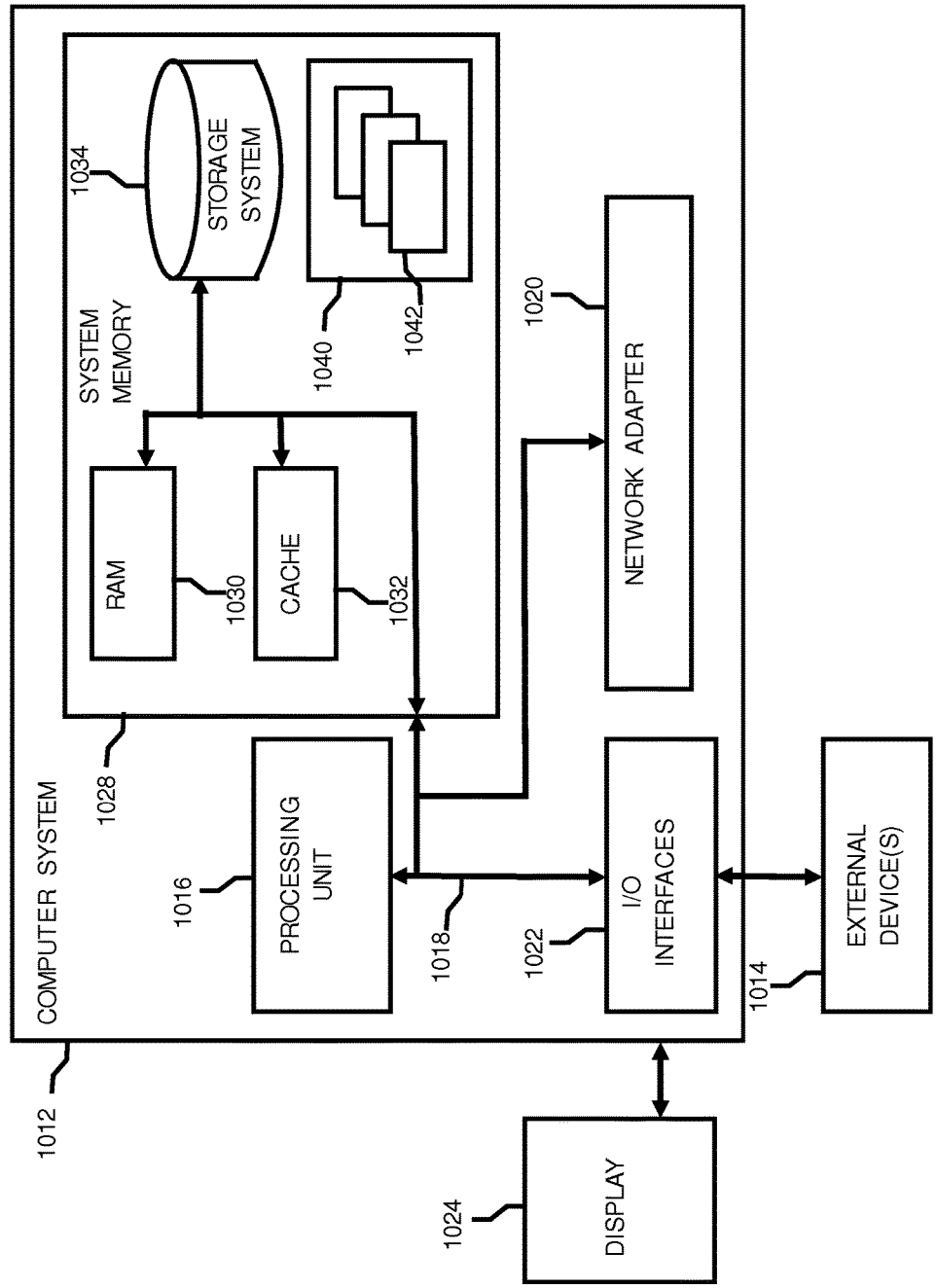
FIG. 10 shows a computer system according to an embodiment of the present invention.

Referring now to FIG. 10, a schematic of an example of computing system is shown. Computer system 1012 is only one example of a suitable computing system and is not intended to suggest any limitation as to the scope of use or functionality of embodiments of the invention described herein. Regardless, computer system 1012 is capable of being implemented and/or performing any of the functionality set forth hereinabove.

Computer system 1012 is operational with numerous other general purpose or special purpose computing system environments or configurations. Examples of well-known computing systems, environments, and/or configurations that may be suitable for use with computer system 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system 1012 is shown in the form of a general-purpose computing device. The components of computer system 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1012 typically includes a variety of computer system readable media. Such media may be any available media that is accessible by computer system 1012, and it includes both volatile and non-volatile media, removable and non-removable media.

System memory 1028 can include computer system readable media in the form of volatile memory, such as random access memory (RAM) 1030 and/or cache memory 1032. Computer system 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system 1012 may also communicate with one or more external devices 1014 such as a keyboard, a pointing device, a display 1024, etc.; one or more devices that enable a user to interact with computer system 1012; and/or any devices (e.g., network card, modem, etc.) that enable computer system 1012 to communicate with one or more other computing devices. Such communication can occur via Input/Output (I/O) interfaces 1022. Still yet, computer system 1012 can communicate with one or more networks such as a local area network (LAN), a general wide area network (WAN), and/or a public network (e.g., the Internet) via network adapter 1020. As depicted, network adapter 1020 communicates with the other components of computer system 1012 via bus 1018. It should be understood that although not shown, other hardware and/or software components could be used in conjunction with computer system 1012. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for processing a structured query language (SQL) statement, the SQL statement comprising at least an OUTER JOIN operation, the computer program product comprising:
   one or more computer readable storage media and program instructions stored on the one or more computer readable storage media, the program instructions comprising program instructions to:
      determine whether a first query and a second query are equivalent, the first and second queries being respectively the left side and the right side operands of the OUTER JOIN operation;
      determine whether an output of the right side of the OUTER JOIN operation contains an output of the left side of the OUTER JOIN operation;
      determine whether partitioning columns of a GROUP BY operation are the same as partitioning columns of the OUTER JOIN operation;
      determine whether columns quantified by the right side of the OUTER JOIN operation include one or both of multiple distinct aggregation operations or multiple aggregation operations;
      determine whether there are no filter predicates or having clause in the GROUP BY operation;
      determine whether a SELECT output of the SQL statement does not refer to database columns from the left side of the OUTER JOIN operation which are not also partitioning columns of the OUTER JOIN operation; and
      responsive to determining that: (i) output of the first side of the OUTER JOIN operation contains the output of the left side of the OUTER JOIN operation, (ii) the partitioning columns of the GROUP BY operation are the same as the partitioning columns of the OUTER JOIN operation, (iii) the columns quantified by the right side of the OUTER JOIN operation include one or both of multiple distinct aggregation operations or multiple aggregation operations, (iv) there are no filter predicates or having clause in the GROUP BY operation, (v) the first query and the second query are equivalent, and (vi) the SELECT output of the SQL statement does not refer to database columns from the left side of the OUTER JOIN operation which are not also partitioning columns of the OUTER JOIN operation, transform the SQL statement into an optimized query SQL statement by removing the OUTER JOIN operation.

2. The computer program product of claim 1, wherein the OUTER JOIN operation is one of a FULL OUTER JOIN, a LEFT OUTER JOIN or a RIGHT OUTER JOIN.

3. The computer program product of claim 1, further comprising program instructions to:
determine whether the partitioning columns of the GROUP BY operation quantified by the right side of the OUTER JOIN operation are the same as the partitioning columns of the GROUP BY operation quantified by the left side of the OUTER JOIN operation; and
wherein said OUTER JOIN operation is removed from the query only in response to determining that the partitioning columns of the GROUP BY operation quantified by the right side of the OUTER JOIN operation are the same as the partitioning columns of the GROUP BY operation quantified by the left side of the OUTER JOIN operation.

4. The computer program product of claim 3, wherein the OUTER JOIN operation is one of a FULL OUTER JOIN, a LEFT OUTER JOIN or a RIGHT OUTER JOIN.

5. The computer program product of claim 1, wherein the OUTER JOIN operation is represented by a RIGHT OUTER JOIN, and further comprising program instructions to:
determine whether the output quantified by the left side of the OUTER JOIN does not match the output quantified by the right side of the OUTER JOIN;
determine whether the output of the right side of the OUTER JOIN operation subsumes the output of the left side of the OUTER JOIN operation;
determine whether partitioning columns of a GROUP BY operation are the same as the portioning columns of the OUTER JOIN operation;
determine whether there are no filter predicates or having clause in the GROUP BY operation; and
responsive to determining that the output quantified by the left side of the OUTER JOIN does not match the output quantified by the right side of the OUTER JOIN, that the output of the right side of the OUTER JOIN operation contains the output of the left side of the OUTER JOIN operation, that the partitioning columns of the GROUP BY operation are the same as the OUTER JOIN partitioning columns and that the columns quantified by the right side of the OUTER JOIN operation include one or both of multiple distinct aggregation operations or multiple aggregation operations, and that there are no filter predicates or having clause in the GROUP BY operation, transform the SQL statement into an optimized query SQL statement by removing the OUTER JOIN operation.

6. The computer program product of claim 1, further comprising program instructions to:
determine whether the partitioning columns of a GROUP BY operation are the same as the partitioning columns of the OUTER JOIN operation;
determine whether the columns quantified by the right side of the OUTER JOIN include one or more of multiple distinct aggregation operations or multiple aggregation operations;
determine whether a filter predicate can be evaluated after the OUTER JOIN operation is removed; and
responsive to determining that the partitioning columns of the GROUP BY operation are the same as the OUTER JOIN Partitioning columns, that the columns quantified by the right side of the OUTER JOIN include one or more of multiple distinct aggregation operations or multiple aggregation operations, and that the filter predicate can be evaluated after the OUTER JOIN operation is removed, transform the SQL statement into an optimized query SQL statement by removing the OUTER JOIN operation.

7. The computer program product of claim 6, wherein:
the OUTER JOIN operation is represented by a LEFT OUTER JOIN;
the SQL statement has a HAVING clause on the multiple distinct aggregation output; and further comprising program instructions to:
determine whether the HAVING clause in the GROUP BY operation can be evaluated after the OUTER JOIN operation is removed; and
further responsive to determining that the HAVING clause in the GROUP BY operation can be evaluated after the OUTER JOIN operation is removed, transform the SQL statement into an optimized query SQL statement by removing the OUTER JOIN operation.

8. A computer system for processing a structured query language (SQL) statement, the SQL statement comprising at least an OUTER JOIN operation, the computer system comprising:
one or more computer processors;
one or more computer readable storage media; and
program instructions stored on the one or more computer readable storage media for execution by at least one of the one or more processors, the program instructions comprising program instructions to:
determine whether a first query and a second query are equivalent, the first and second queries being respectively the left side and the right side operands of the OUTER JOIN operation;
determine whether an output of the right side of the OUTER JOIN operation contains an output of the left side of the OUTER JOIN operation;
determine whether partitioning columns of a GROUP BY operation are the same as partitioning columns of the OUTER JOIN operation;
determine whether columns quantified by the right side of the OUTER JOIN operation include one or both of multiple distinct aggregation operations or multiple aggregation operations;
determine whether there are no filter predicates or having clause in the GROUP BY operation;
determine whether a SELECT output of the SQL statement does not refer to database columns from the left side of the OUTER JOIN operation which are not also partitioning columns of the OUTER JOIN operation; and
responsive to determining that: (i) output of the first side of the OUTER JOIN operation contains the output of the left side of the OUTER JOIN operation, (ii) the partitioning columns of the GROUP BY operation are the same as the partitioning columns of the OUTER JOIN operation, (iii) the columns quantified by the right side of the OUTER JOIN operation include one or both of multiple distinct aggregation operations or multiple aggregation operations, (iv) there are no filter predicates or having clause in the GROUP BY operation, (v) the first query and the second query are equivalent, and (vi) the SELECT output of the SQL statement does not refer to database columns from the left side of the OUTER JOIN operation which are not also partitioning columns of the OUTER JOIN operation, transform the SQL statement into an optimized query SQL statement by removing the OUTER JOIN operation.

9. The computer system of claim 8, wherein the OUTER JOIN operation is one of a FULL OUTER JOIN, a LEFT OUTER JOIN or a RIGHT OUTER JOIN.

* * * * *